US009988161B2

(12) United States Patent
Gupta et al.

(10) Patent No.: US 9,988,161 B2
(45) Date of Patent: Jun. 5, 2018

(54) METHOD FOR OPTIMIZING THE PLACEMENT OF CHECK-IN BAGS IN AIRCRAFT

(71) Applicants: Mohit Gupta, Atlanta, GA (US); Aarohi Shah, Marietta, GA (US); Karthik Ramachandran, Atlanta, GA (US)

(72) Inventors: Mohit Gupta, Atlanta, GA (US); Aarohi Shah, Marietta, GA (US); Karthik Ramachandran, Atlanta, GA (US)

( * ) Notice: Subject to any disclaimer, the term of this patent is extended or adjusted under 35 U.S.C. 154(b) by 0 days. days.

(21) Appl. No.: 15/616,123

(22) Filed: Jun. 7, 2017

(65) Prior Publication Data

US 2017/0349299 A1 Dec. 7, 2017

Related U.S. Application Data

(60) Provisional application No. 62/346,648, filed on Jun. 7, 2016.

(51) Int. Cl.
*G06F 7/00* (2006.01)
*B64F 1/36* (2017.01)
(Continued)

(52) U.S. Cl.
CPC .......... *B64F 1/368* (2013.01); *G06K 7/10861* (2013.01); *G06K 19/06028* (2013.01); *G06K 19/0723* (2013.01)

(58) Field of Classification Search
None
See application file for complete search history.

(56) References Cited

U.S. PATENT DOCUMENTS 6,923,375 B2 8/2005 Stefani
8,185,234 B2 5/2012 Tietjen et al.
(Continued)

FOREIGN PATENT DOCUMENTS

WO    WO 2014161556 A1    10/2014

*Primary Examiner* — Yolanda R Cumbess
(74) *Attorney, Agent, or Firm* — Bryan W. Bockhop; Bockhop Intellectual Property Law, LLC (57) ABSTRACT

In a method of loading checked luggage on unit load devices corresponding to an aircraft having a passenger compartment, each piece of checked luggage is associated with a unique identifier. Each piece of checked luggage is weighed and its weight is associated with its corresponding unique identifier. A best possible luggage placement is calculated considering a distribution of passenger weight, thereby allowing the passengers to sit at their preferred location rather than by pre-allocation. A desired placement of the checked luggage is calculated based on the weight of each piece of checked luggage, the acceptable distribution of weight in the passenger compartment and overall fuel state over mission profile. Loading personnel are allowed to place luggage in the unit load devices and are instructed to stop loading the selected ones of the unit load devices when a deciding point is dynamically achieved by a recalculation of center of gravity shift each time a bag is loaded onto one of the unit load devices so as to achieve the best possible placement of check luggage. The recalculation of the center of gravity shift is done based on placement of the unit load devices in the aircraft luggage compartments.

12 Claims, 6 Drawing Sheets

(51) Int. Cl.
    *G06K 19/07*     (2006.01)
    *G06K 19/06*     (2006.01)
    *G06K 7/10*     (2006.01)

(56) References Cited

U.S. PATENT DOCUMENTS

| | | | |
|---|---|---|---|
| 2007/0255489 A1 | 11/2007 | Jensen et al. | |
| 2009/0192846 A1* | 7/2009 | Stefani | G01G 19/07 705/7.41 |
| 2014/0077952 A1* | 3/2014 | Boss | G06Q 10/0832 340/572.1 |

\* cited by examiner

```
Data: CG: calibrated centre of gravity
Data: bags: b[1..n], each with length, breadth, height and mass
Data: n: number of bags
Data: m: number of compartments
Data: c[1..m]: compartments, each with length, breadth, height,
       capacity,bags and distance to CG
Data: n: number of bags
Data: seats: seating arrangement consisting of the seat position relative
       to the CG and weight of the passenger
Data: seatcapacity: seating capacity of the aircraft
Result: Compartment to place each bag
Function adjustCG(seats)
    moment = 0;
    distance = 0;
    for i = 1 to seatcapacity do
        moment += seats[i].position * seats[i].mass;
        distance += seats[i].position;
    end
    return moment / distance;
/**************INITIALIZATION**************/
CG = adjustCG(seats);
remainingBags = [];
for i = 1 to n do
    compartment[i].bags = []
end
currentCompartment = getClosestToCG();
/**********END OF INITIALIZATION***********/
Function getClosetToCG()
    minDist = ∞;
    minCompartment = NULL;
    for c in compartments do
        if c.distance < minDist then
            minDist = c.distance;
            minCompartment = c;
        end
    end
    return minCompartment;
Function getMoment(compartment)
    totalMoment = 0;
    for i = 1 to nbags do
        totalMoment = totalMoment + compartment.bags[i].mass *
        compartment.distance;
    end
    return totalMoment;
Function getMass(compartment)
    totalMass = 0;
    for i = 1 to nbags do
        totalMass = totalMass + compartment.bags[i].mass;
    end
    return totalMass;
```

FIG. 3A 3A-3B

```
Function placeBag(compartment, bag)
    if compartment is not fully loaded then
        compartment.bags.add(bag);
        return success
    else
        return failure
    end
Function removeBag(compartment, bag)
    compartment.remove(bag);
Function removeAllBags(compartment)
    for b in compartment.bags do
        removeBag(compartment, b);
    end
Function setLoaded(compartment)
    compartment.loaded = true;
Function getCG()
    totalMass = 0;
    totalMoment = 0;
    for i = 1 to m do
        totalMass = totalMass + getMass(compartments[i]);
        totalMoment = totalMoment + getMoment(compartments[i]);
    end
    return totalMoment /totalMass;
Function staticLoad()
    bagsInCompartment[n] =[] ;
    //data structure to hold the bags belonging to a particular
    compartment
    for b in bags do
        c = getCompartment(b, currentCompartment, e);
        if c != NULL then
            bageInCompartment[c].append(b.id);
        else
            return c ;
        end
    end
    return bagsInCompartments;
```

```
Function getCompartment(bag, currentCompartment, ε)
    currentCG = getCG();
    if placeBag(currentCompartment,bag) = success then
        newCG = getCG();
        //Adding this bag shifts the CG towards its original
        position(condition 1)
        if |newCG - CG| ≤ |currentCG - CG| then
         |  return currentCompartment;
        end
    else
        founCompartment = false;
        for c in compartments do
            if c.loaded = false then
                for b in remainingBags do
                    if b ≠ bag then
                        currentCG = getCG();
                        if placeBag(c,b) = success then
                            newCG = getCG();
                            if |newCG - CG| ≥ |currentCG - CG| then
                             |  break;
                            end
                            //Enough bags to balance the moments
                            produced by the
                            //current compartment (condition 2)
                            if |newCG - CG| ≤ ε then
                                foundCompartment = true;
                                break;
                            end
                        else
                         |  break;
                        end
                    end
                end
                if foundCompartment = true then
                    removeAllBags(c);
                    //This is the last bag to be loaded in compartment c
                    if comparment capacity is full then
                     |  setLoaded(c);
                    end
                    return c;
                end
            end
            return NULL;
        end
    end
        Algorithm 1: Optimal Luggage Placement Algorithm
```

METHOD FOR OPTIMIZING THE PLACEMENT OF CHECK-IN BAGS IN AIRCRAFT

CROSS-REFERENCE TO RELATED APPLICATION(S)

This application claims the benefit of U.S. Provisional Patent Application Ser. No. 62/346,648, filed Jun. 7, 2016, the entirety of which is hereby incorporated herein by reference.

BACKGROUND OF THE INVENTION

1. Field of the Invention

The present invention relates to aircraft weight and balance systems and, more specifically, to a system for optimizing placement of checked-in luggage in an aircraft.

2. Description of the Related Art

The center of gravity is the point about which the mass center of the aircraft lies. It is obtained when the aircraft is manufactured, and must be within a certain limit (referred to as static margin), as specified by the aircraft manufacturer in order to maintain stability and fly safely. In order to, maintain the stability, the center of gravity calculations are performed along the longitudinal axis from the considered datum (which is given by the OEM-Original Equipment Manufacturer). The location of the center of gravity (CG) is a complex function of configuration, loading and fuel state, and the allowable range for the CG is limited by a number of factors. Check-in bags and cargo contribute to a significant portion of the weight carried by an aircraft. The placement of luggage within the cargo compartments can possibly $$X = \frac{\sum_{i=1}^{n} m_i x_i}{\sum_{i=1}^{n} m_i} \quad (1)$$

$$Y = \frac{\sum_{i=1}^{n} m_i y_i}{\sum_{i=1}^{n} m_i} \quad (2)$$

shift the center of gravity of the aircraft. The CG can be calculated as follows:
Where $m_i$ is the mass of the $i^{th}$ particle and $x_i$ is the position of the particle along the x axis. Similarly $y_i$ is the position of the particle along the y axis. Note that each bag is being treated as a point mass. The size of the bags is only considered to identify the placement of each bag in the compartment. The parameter $m_i x_i$ is the moment generated by the bag, about the y axis. The moments generated by the bags about the CG need to be balanced so that it doesn't shift.

The CG for the aircraft is calibrated when it is manufactured. Once the aircraft is refueled, passengers board and bags/cargo is added to the aircraft, the CG is re-estimated. If the CG lies outside the static margin, ballast weights are added or trim adjustments are made to ensure that the CG is within the static margin for the safe operation of the flight. This kind of compensation for the CG position is both inefficient and expensive, since the aircraft experiences a greater effective load and needs to expend more fuel.

Therefore, there is a need for a solution that avoids the additional trim and losses associated with it.

SUMMARY OF THE INVENTION

The disadvantages of the prior art are overcome by the present invention which, in one aspect, is a method of loading checked luggage on an aircraft having a passenger compartment and a plurality of luggage compartments, in which each piece of checked luggage is associated with a unique identifier. Each piece of checked luggage is weighed and its weight is associated with its corresponding unique identifier. A best possible luggage placement is calculated considering a distribution of passenger weight, thereby allowing passengers to sit at their preferred location rather than by pre-allocation. A desired placement of the checked luggage is calculated based on the weight of each piece of checked luggage and the acceptable distribution of weight in the passenger compartment and overall fuel state over mission profile. Loading personnel are allowed to place luggage in luggage compartments in the aircraft and loading personnel are instructed to stop loading when a deciding point is dynamically achieved by recalculation of a center of gravity shift each time a bag is loaded onto the aircraft so as to achieve a best possible placement of checked baggage.

In another aspect, the invention is a method of loading checked luggage on unit load devices corresponding to an aircraft having a passenger compartment, in which each piece of checked luggage is associated with a unique identifier. Each piece of checked luggage is weighed and its weight is associated with its corresponding unique identifier. A best possible luggage placement is calculated considering a distribution of passenger weight, thereby allowing the passengers to sit at their preferred location rather than by pre-allocation. A desired placement of the checked luggage is calculated based on the weight of each piece of checked luggage, the acceptable distribution of weight in the passenger compartment and overall fuel state over mission profile. Loading personnel are allowed to place luggage in the unit load devices and are instructed to stop loading the selected ones of the unit load devices when a deciding point is dynamically achieved by a recalculation of center of gravity shift each time a bag is loaded onto one of the unit load devices so as to achieve the best possible placement of check luggage. The recalculation of the center of gravity shift is done based on placement of the unit load devices in the aircraft luggage compartments.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "compartment" refers to the storage area in an aircraft, which is also called a bin, a storage space or a luggage/cargo storage compartment.

Figure 1:
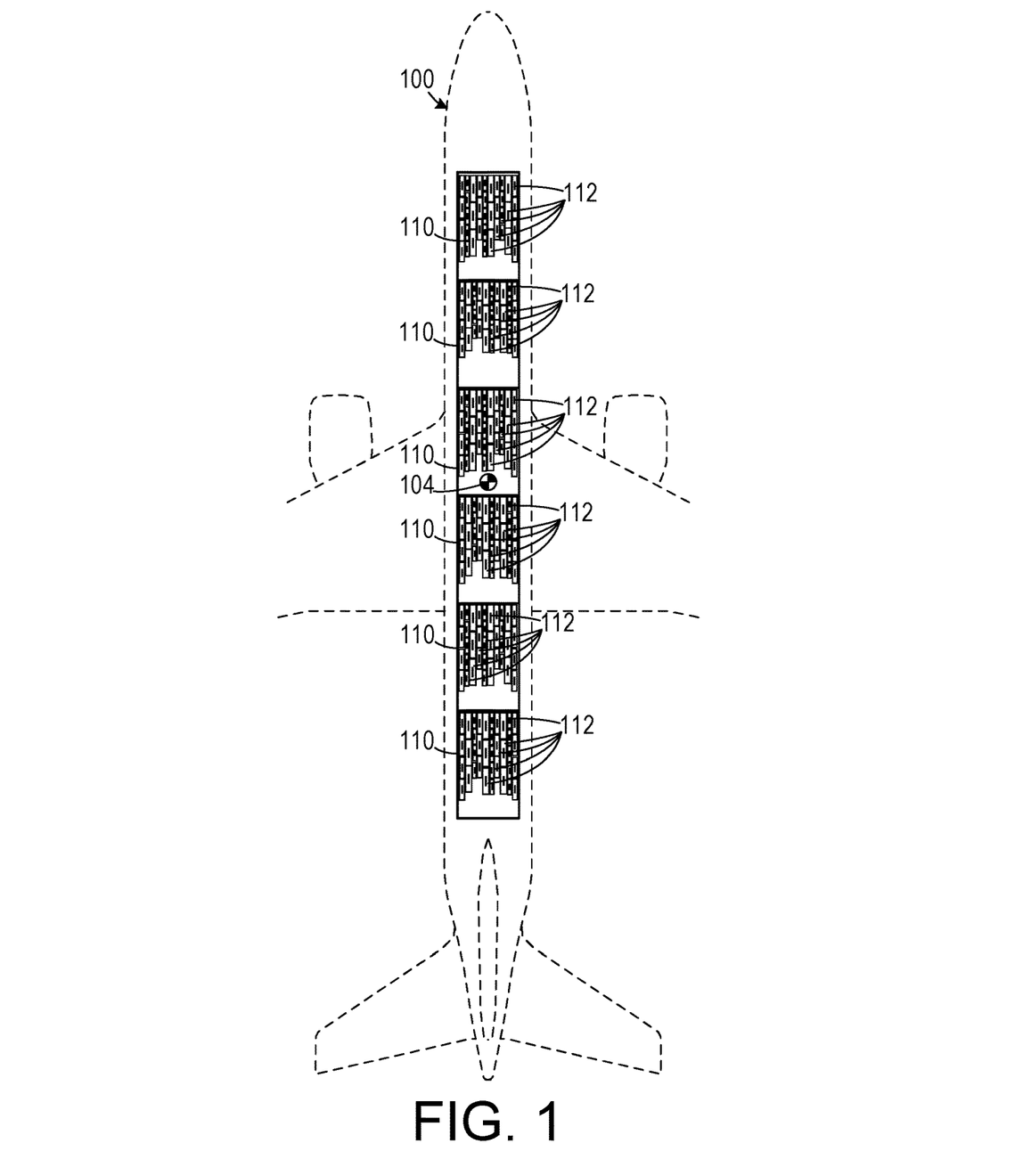
FIG. 1 is a schematic diagram showing luggage placement on an aircraft according to one representative embodiment.

As shown in FIG. 1, an aircraft 100 has a plurality of luggage units 110 for storing luggage therein 112, which would be luggage sub-compartment in the case of smaller aircraft or unit load devices (ULDs) in the case of larger aircraft. The aircraft 100 also has a preferred center of gravity 104, which is the center of gravity which, when achieved after loading, results in a minimal amount of trimming, which results in more efficient fuel usage. To achieve the preferred center of gravity 104, each piece of luggage 112 is weighed and uniquely identified at check in. As the luggage 112 is being loaded, the effect on the center of gravity 104 imposed by each piece of luggage is calculated as each piece of luggage is placed in a luggage unit 110 and loading personnel are instructed to cease loading specific ones of the loading units 110 so as to achieve the preferred center of gravity 104 for the aircraft 100.

One embodiment includes a method of guiding the personnel placing bags in compartments or ULDs. This method would inform the personnel to start loading in one or more specific compartments or ULDs depending on the availability of resources with the personnel, at the hanger. Further, this method would inform the personnel to stop loading the units of bags and cargo in the compartments and move to load different compartments. This would result in implementation of the load plan obtained from an already existing tool or eventually results in an optimum trim solution desired by the pilots for that particular aircraft, without micro-managing the activities of the personnel. This involves balancing the moments about the y-axis (where x, y and z axis are the roll, pitch and yaw axes, respectively). Balancing the moments about y-axis allows the system to minimize the change in the location of the CG along x-axis which in turn helps in minimizing the dead weight carried on board or minimize the trim adjustment required to be made by the pilot as mentioned above. If an existing load planning tool is being used, information about the optimal trim solution may be derived from that tool as well.

Figure 2:
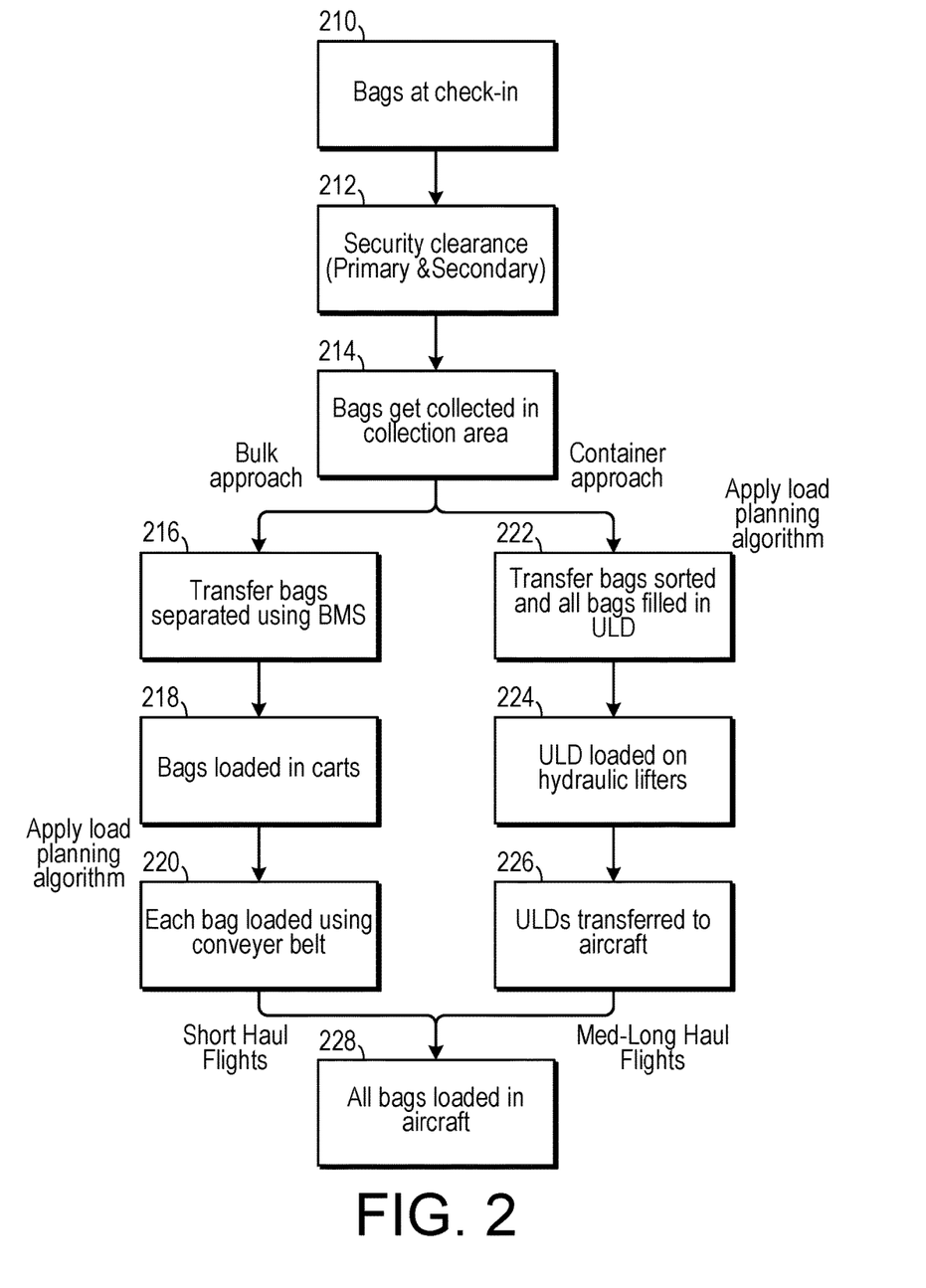
FIG. 2 is a flowchart showing one representative loading method.

As shown in FIG. 2, at the time of check in 210, the weight and shape characteristics of the bag become available to the Baggage Management System (BMS) of an airline. When a bag is checked in, a remotely-sensible unique identifier, such as but not limited to a radio frequency identification (RFID) tag or a barcode is attached to (or otherwise associated with) the bag so that it can be uniquely identified during loading. Once all the passengers are checked in (up to 30-40 min before take-off), the system has the information about every bag which is to be placed in the luggage compartment. Specifically, the system has the weight of each bag associated with its unique identifier.

The bags pass through security 212 and are collected in a collection area 214 for subsequent loading on an aircraft. If the aircraft does not employ ULDs, then the bags are separated using the baggage management system (BMS) 216, loaded onto carts 218 and then loaded using a conveyor belt system 220. During the loading step, the system employs a load planning algorithm to achieve the preferred CG of the aircraft. If the system employs ULDs, the bags are sorted in filled into the ULDs 222, employing the load planning algorithm during the ULD loading step. The ULDs are loaded onto hydraulic lifters 224 and are transferred to the ULD storage compartment of the aircraft. This results in the bags being loaded in the aircraft 228 so as to achieve the preferred CG of the aircraft.

In one embodiment, the dynamic allocation of bags or cargo is undertaken at the aircraft site while the loading is in progress. Essentially, at the time when a bag is to be loaded into the compartment, the system retrieves the information about the bags/cargo using the identifier tag and the reader along with information about passengers' seating arrangement. Next, using the information the system indicates a compartment where the bags/cargo can be loaded followed by letting the personnel know whether to continue loading the compartment or not, to minimize the trim adjustments for a specific aircraft. Loading of the bags/cargo is continues in the same compartment if the moment generated by the bags/cargo in this compartment can be balanced by the remaining bags/cargo which have not yet been loaded or if it is following a well-defined load plan. Note that this is possible because the system has the information about each bag/cargo that has been checked-in and the algorithm is designed to accommodate any last-minute alterations to this data of the bags, cargo and passengers' seating arrangement. Once the system indicates that the moment cannot be balanced any further by adding bags to that compartment, it shall be followed by making the loading personnel aware to stop loading in that compartment and instructs the operator to start loading the rest of the bags in another compartment. This can be done in several ways, including but not limited to automatic cease of the conveyor belt which takes the bag to the compartment, or a light which blink thus indicating to stop loading or a simple walkie-talkie message. Also, there can be provisions for application of the approach while considering the cases in which the flight is delayed, is a connecting flight which already has few passengers with allocated seats, payload such as bags and cargo already loaded, different classes of bags such as priority, fragile, transfer or general along with information about special items in luggage or cargo.

Also, the weight and seating arrangement of each passenger can be acquired at check-in. This can be done in one of several ways, including asking the passenger his or her weight, estimating passenger weight in one or more ways such as assigning a suitable averaged Body Mass Index (BMI) using the information the system already like origin, age and or visual appearance. In the embodiment, the aircraft could even be fitted with weight sensors in each seat. With flights that do not have pre-assigned seating, a flight attendant or a crew member can estimate the weight distribution by comparing the current visually-observed seating with a series of templates termed as presets.

A summary of the steps for optimal loading of the bags includes the following:
1. Scan bags at check-in and attach a unique identifier tag.
2. Acquire the details about the cargo (size and weight) as well as the passengers such as the seats and the weight estimation.
3. Store the information in some computer readable format like CSV or a spreadsheet for the data to be entered in the database accessible to the baggage management system.
4. Repeat steps 1-3 for all bags, cargo and passengers.
5. During loading, start placing the bags on the conveyer belt after reading the identifier using a handheld device or using an automatic reader installed on the side of the conveyor.
6. Supply details of the bags/cargo that have been loaded along with estimates of the passenger weight and seating chart to the algorithm.
7. Process the information acquired to obtain moment balancing information and optimal trim solution.
8. Repeat steps 5-7 till the system finds an appropriate point to stop loading in a compartment to obtain an optimum trim solution for minimum trim adjustment beyond the adjustment desired by the pilots.
9. Stop loading once indicated by appropriate indication system.

The algorithm can be implemented in different ways. The embodiment considers a web front end with mobile front end or a direct integration with the BMS. In this embodiment, the unique identifier information after being scanned is sent to the web application which then directs the personnel about continuing the loading or stopping the loading in that respective compartment or ULD. The basic stacking sequence is required to be known from the stacker or otherwise a way to load the cargo/bags breadthwise at the edge closer to the CG can be informed beforehand to the stacker.

Figure 3A:
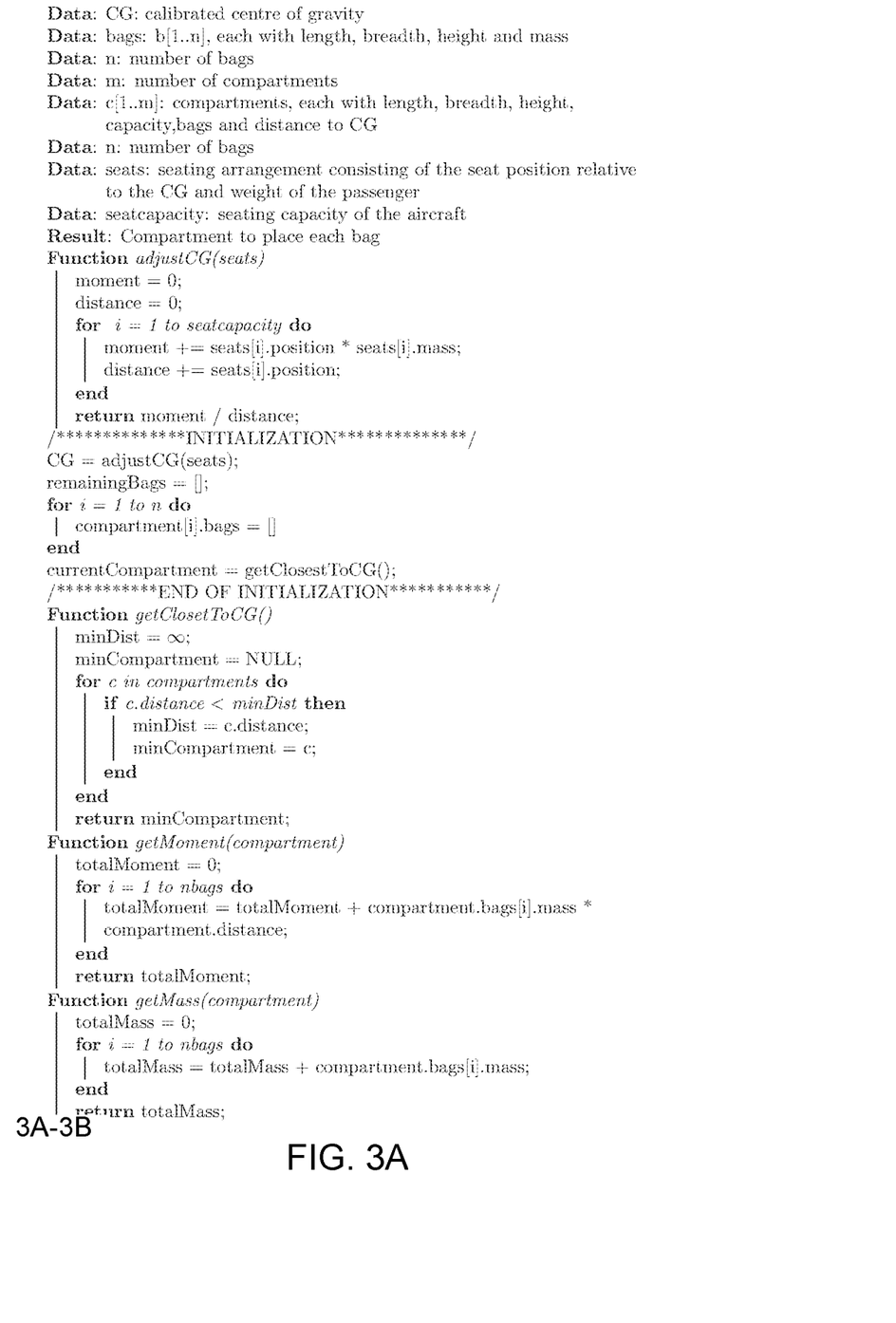
FIGS. 3A-3C are listings of an algorithm that may be employed in one embodiment.
Figure 3B:
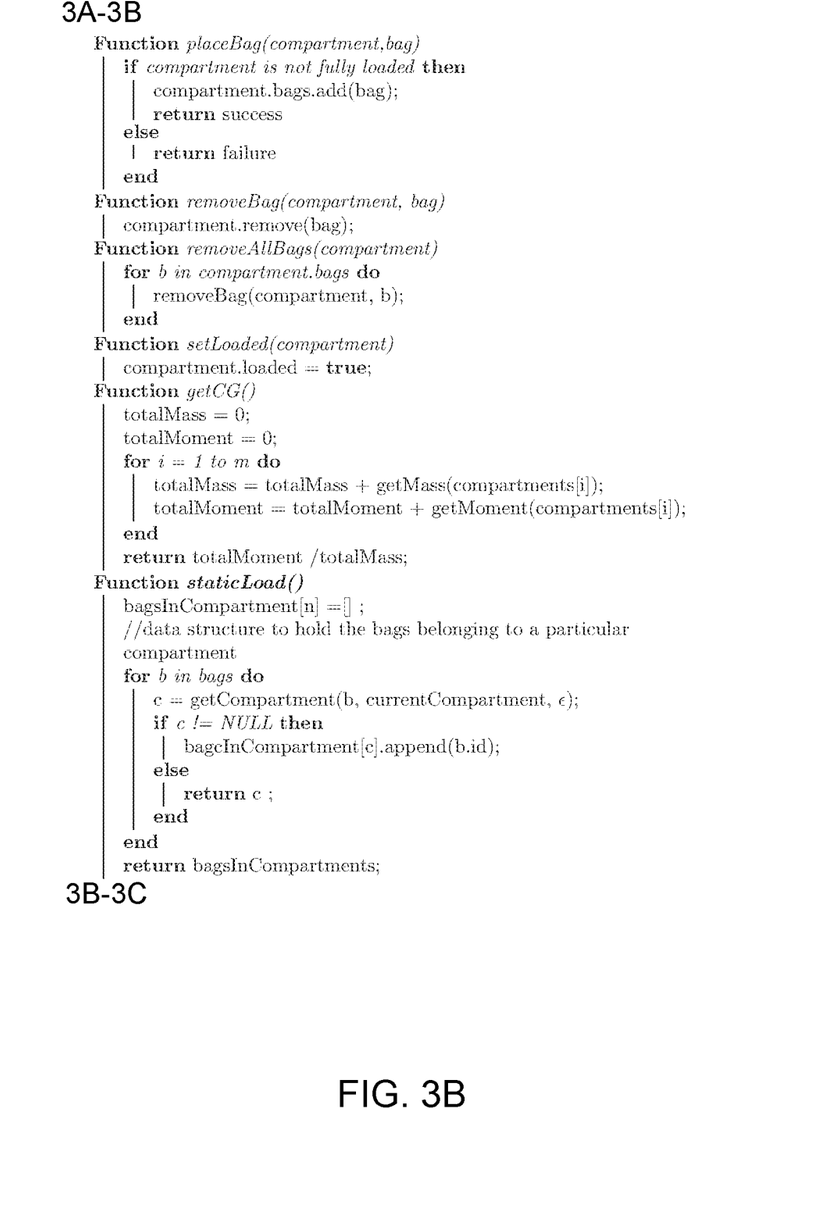
Figure 3C:
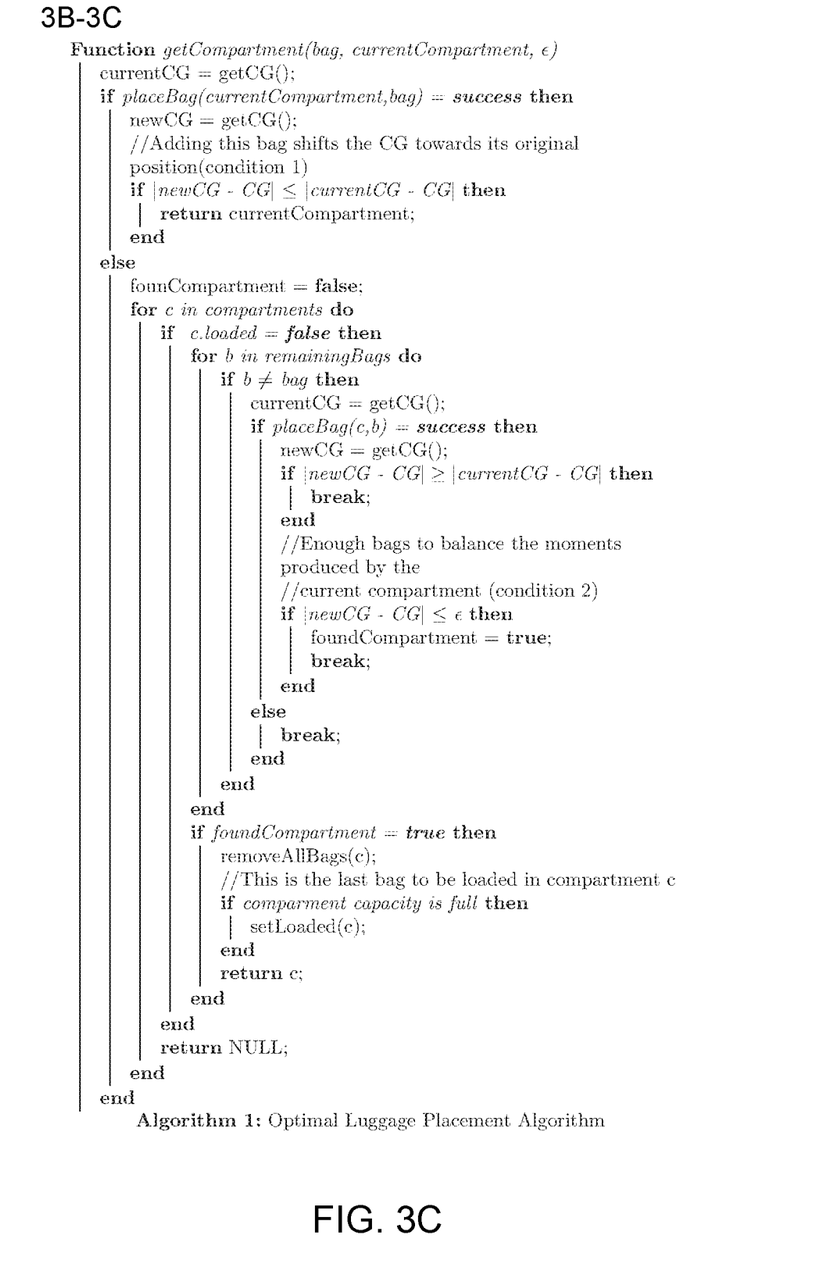

An example of the algorithm that can be used in deciding luggage and cargo placement is shown in FIGS. 3A-3C. The following examples demonstrate use of this algorithm. Let there be 2 compartments C1 and C2. The specifications of C1 and C2 are as follows:
C1: length=10, breadth=10, height=10, distance to CG=10
C2: length=10, breadth=10, height=10, distance to CG=−10
The bags (length,breadth,height,weight) to be loaded are:
b1: (0.1,0.1,0.1, 5), b2: (0.1,0.1,0.1,5), b3: (0.1,0.1,0.1,5), b4: (0.1,0.1,0.1,5)
It is important to note that it is not predetermined that the bag b1 is loaded first and subsequently the other bags in sequence. This is just a representation of the bags which are actually loaded by the ground personnel and the calculations are being done while the loading is in progress.

Initially, no bag has been loaded, and the currentCompartment is set to C1 if C1 is closes to the desired location/original location of CG or the optimum trim solution. Now, getCompartment( ) is called, and the moment generated by b1 (weight of b1×distance from CG)=10×5 can be balanced by placing b2 in C2 (condition 2). This information can be either derived from a load plan document or use the built algorithm. This way, before loading, the ground personnel would be informed that any bag or cargo must be first loaded in that specific compartment. So, the first bag which the personnel loads is loaded in C1.

Next, the second bag b2 is handled. Placing b2 in C1 can be balanced by placing b3 in C2, since the moment generated by b3 and b4 in C2 is in the opposite direction. Thus, after loading the second bag, a message is shown to the ground personnel asking him to stop loading in the compartment C1 and move to load the remaining bags in Compartment C2. Thus, placing b3 in C2 contributes to balancing the moment from C1 (condition 1). Finally, placing b4 in C2 cancels the moment generated by the bags in C1 (condition 1), so b4 is assigned to C2.

The algorithm aims to dynamically enforce either a self-obtained load plan or a load plan obtained from an already implemented tool to finally be implemented on an aircraft such that the moments produced from each compartment about the original CG are balanced or shift the CG to a desired location of optimum trim adjustment. Implementation of this algorithm doesn't affect the normal ground operations at the airport as well as do not enforce conditions on stackers to stack the bags in a specific way as mentioned by some of the prior art. The algorithm also features an advantage of considering loading multiple compartments at a time, balancing the passenger weight by appropriate placement of luggage and cargo in different compartments. Generally, there is an efficiency reduction of 4-6% in current situation when the passenger weight is trimmed. Even in the case when flight is delayed, the algorithm will be able to decide whether it is useful to perform the optimization of loading or not by performing a break-even analysis to ensure that the cost expended at the hangar should be lesser than the cost saved by performing the optimization procedure.

The application of the algorithm can be done at different stages involved in departure mapping depending upon the airliner's discretion, type of aircraft or duration of flight. In case of short haul flights, where luggage is loaded by the bulk approach of loading each bag individually through conveyer belts, the algorithm can be implemented at the site of the aircraft while loading is taking place. This mainly applies to narrow-body aircraft or regional aircraft. In case, of medium/long haul flights luggage is usually packed in ULDs and these are loaded in the aircraft. In this case, the algorithm can be successfully implemented at the sorting stage of the departure mapping diagram (or the consumer journey diagram). The algorithm in this case can scan the bags going to a ULD and the system can indicate when and how many ULDs go to a bin. This case also applies to airliners that operate wide body aircraft.

Figure 4:
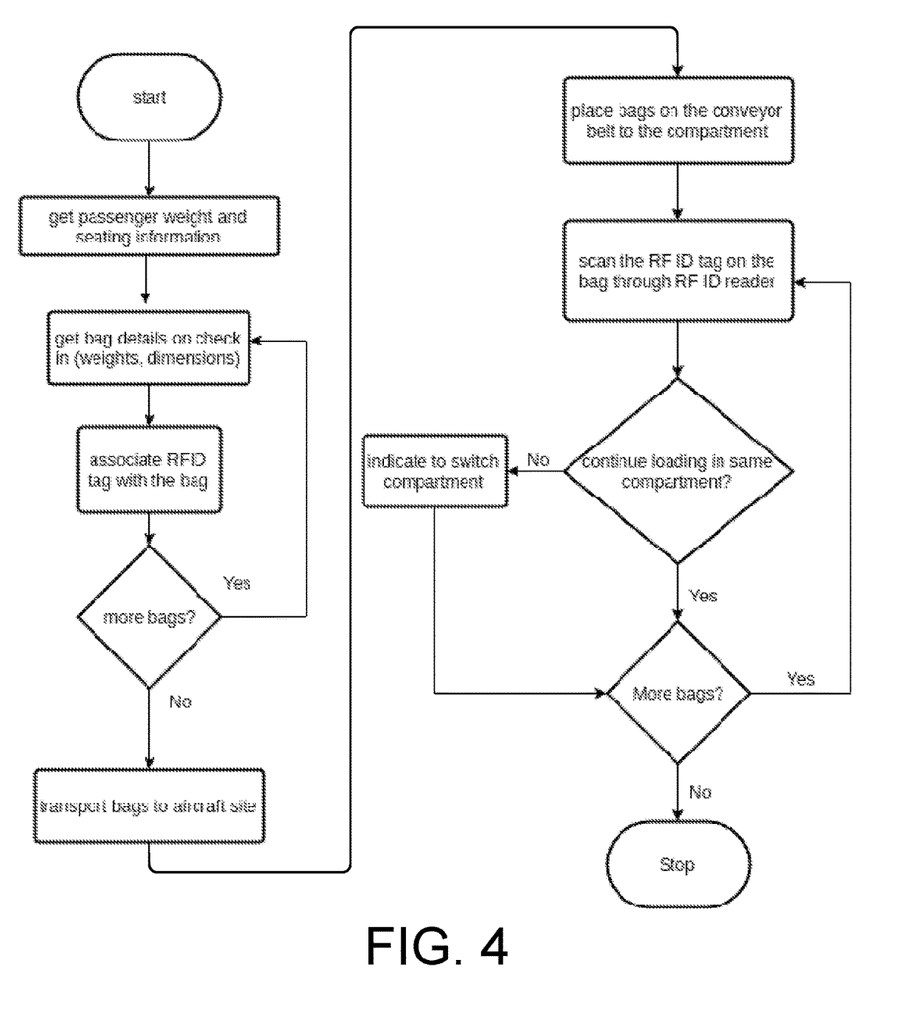
FIG. 4 is a flowchart showing one representative method for optimizing placement of checked-in bags.

The algorithm is adaptive in the sense of taking last minute changes in the cabin baggage that comes to the bin in the last minute and considers the operations aspect of transfer bags in the sequence of loading and unloading. This method is shown graphically in FIG. 4.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:
1. A method of loading checked luggage on an aircraft having a passenger compartment and a plurality of luggage compartments, comprising the steps of:
   (a) associating each piece of checked luggage with a unique identifier;
   (b) weighing each piece of checked luggage and associating its weight with its corresponding unique identifier;

(c) calculating a best possible luggage placement considering a distribution of passenger weight, thereby allowing passengers to sit at their preferred location rather than by pre-allocation;

(d) calculating a desired placement of the checked luggage based on the weight of each piece of checked luggage, an acceptable distribution of weight in the passenger compartment and overall fuel state over mission profile; and (e) allowing loading personnel to place luggage in luggage compartments in the aircraft and instructing loading personnel to stop loading when a deciding point is dynamically achieved by recalculation of a center of gravity shift each time a bag is loaded onto the aircraft so as to achieve a best possible placement of checked baggage.

2. The method of claim 1, wherein each unique identifier is applied in a tangible form to its corresponding piece of checked luggage.

3. The method of claim 2, wherein the unique identifier is applied to at least one of a tag or a label.

4. The method of claim 3, wherein the tag comprises an RFID tag.

5. The method of claim 3, wherein the label comprises a label with a code printed thereon.

6. The method of claim 1, wherein the calculating step is further based on a weight distribution model of the passengers on the aircraft.

7. A method of loading checked luggage on unit load devices corresponding to an aircraft having a passenger compartment, comprising the steps of:

(a) associating each piece of checked luggage with a unique identifier;

(b) weighing each piece of checked luggage and associating its weight with its corresponding unique identifier;

(c) calculating a best possible luggage placement considering a distribution of passenger weight, thereby allowing passengers to sit at their preferred location rather than by pre-allocation;

(d) calculating a desired placement of the checked luggage based on the weight of each piece of checked luggage and an acceptable distribution of weight in the passenger compartment and overall fuel state over mission profile; and (e) allowing loading personnel to place luggage in the unit load devices and instructing loading personnel to stop loading selected ones of the unit load devices when a deciding point is dynamically achieved by a recalculation of a center of gravity shift each time a bag is loaded onto one of the unit load devices so as to achieve a best possible placement of checked luggage, wherein the recalculation of the center of gravity shift is done based on placement of the unit load devices in the aircraft luggage compartments.

8. The method of claim 7, wherein each unique identifier is applied in a tangible form to its corresponding piece of checked luggage.

9. The method of claim 7, wherein the unique identifier is applied to at least one of a tag or a label.

10. The method of claim 9, wherein the tag comprises an RFID tag.

11. The method of claim 9, wherein the label comprises a label with a code printed thereon.

12. The method of claim 7, wherein the calculating step is further based on a weight distribution model of the passengers on the aircraft.

* * * * *